(12) United States Patent
Edpalm et al.

(10) Patent No.: US 11,653,100 B2
(45) Date of Patent: May 16, 2023

(54) EXPOSURE TIME CONTROL IN A VIDEO CAMERA

(71) Applicant: Axis AB, Lund (SE)

(72) Inventors: Viktor Edpalm, Lund (SE); Andreas Irestål, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 17/682,435

(22) Filed: Feb. 28, 2022

(65) Prior Publication Data

US 2022/0329717 A1 Oct. 13, 2022

(30) Foreign Application Priority Data

Apr. 13, 2021 (EP) ..................................... 21167954

(51) Int. Cl.
*H04N 23/73* (2023.01)
*H04N 23/54* (2023.01)

(52) U.S. Cl.
CPC ............. *H04N 23/73* (2023.01); *H04N 23/54* (2023.01)

(58) Field of Classification Search
CPC ........ H04N 23/73; H04N 23/54; H04N 23/71; H04N 23/72; G03B 7/093
See application file for complete search history.

(56) References Cited

U.S. PATENT DOCUMENTS

| 9,426,357 | B1 | 8/2016 | Campbell | |
|---|---|---|---|---|
| 2003/0184673 | A1* | 10/2003 | Skow | ...................... H04N 23/71 |
| | | | | 348/E5.034 |
| 2006/0192867 | A1* | 8/2006 | Yosefin | ................ H04N 25/533 |
| | | | | 348/E9.01 |

(Continued)

FOREIGN PATENT DOCUMENTS

| CN | 106454145 A | 2/2017 |
|---|---|---|
| CN | 104539852 B | 5/2018 |

(Continued)

OTHER PUBLICATIONS

John K Tsotso et al, "A Possible Reason for why Data-Driven Beats Theory-Driven Computer Vision" arxiv.org, Cornell University Library, 201 Olin Library Cornell University, Ithaca, NY 14853, Aug. 28, 2019 XP081498234.

(Continued)

*Primary Examiner* — Jason A Flohre
(74) *Attorney, Agent, or Firm* — Volpe Koenig

(57) ABSTRACT

An exposure time controller for controlling an exposure time (ET) variable of a video camera, which is associated with an auto-exposure algorithm configured to reduce an exposure mismatch ($\Delta E$) by incrementing and decrementing the ET variable, which comprises: a memory for recording ET values applied while the video camera is imaging a scene and the algorithm is active; and processing circuitry configured to: determine that the exposure mismatch exceeds a threshold while the video camera is imaging the scene; estimate a distribution of the recorded ET values; based on the estimated distribution, identify multiple relatively most frequent ET values; and, in reaction to determining that the exposure mismatch exceeds the threshold, assign one of the identified ET values to the ET variable.

16 Claims, 2 Drawing Sheets

(56) References Cited

U.S. PATENT DOCUMENTS

| | | | |
|---|---|---|---|
| 2007/0182845 A1* | 8/2007 | Hunter | H04N 23/73 |
| | | | 348/E5.037 |
| 2009/0086085 A1* | 4/2009 | Asoma | G06T 5/40 |
| | | | 348/E5.034 |
| 2011/0298886 A1* | 12/2011 | Price | H04N 23/71 |
| | | | 348/E5.037 |
| 2012/0188440 A1* | 7/2012 | Takeuchi | H04N 23/74 |
| | | | 348/E5.037 |
| 2016/0173749 A1* | 6/2016 | Dallas | H04N 23/684 |
| | | | 348/208.6 |
| 2018/0048829 A1* | 2/2018 | Chan | G06F 18/24 |
| 2018/0278823 A1 | 9/2018 | Horesh | |
| 2019/0191106 A1 | 6/2019 | Dabral | |
| 2019/0219891 A1* | 7/2019 | Iwai | H04N 23/73 |
| 2020/0077003 A1* | 3/2020 | Tan | H04N 23/60 |
| 2022/0046161 A1* | 2/2022 | Ye | H04N 1/40012 |

FOREIGN PATENT DOCUMENTS

| | | |
|---|---|---|
| CN | 108777768 A | 11/2018 |
| CN | 109167929 A | 1/2019 |
| EP | 3783882 A1 | 2/2021 |

OTHER PUBLICATIONS

Extended European Search Report in EP Application No. 21167954.3, dated Sep. 24, 2021 (30 pgs.).

\* cited by examiner

EXPOSURE TIME CONTROL IN A VIDEO CAMERA

FIELD OF INVENTION

The present disclosure relates to the field of photographic imaging and, in particular, to method and devices for controlling an exposure time variable of a video camera that is associated with an autoexposure algorithm.

TECHNICAL BACKGROUND

An autoexposure (AE) functionality is included in a large share of the video cameras on the consumer and professional market. This functionality may comprise an AE control loop configured to detect an exposure mismatch, which it tries to reduce or remove by incrementing or decrementing an exposure time variable of the video camera. An AE control loop should be designed—and its control gain(s) and other controller settings should be tuned—in such manner that it responds fast to changes in lighting conditions yet behaves stably, without oscillations or similar artifacts. Nonetheless, slow AE convergence is frequently reported, e.g., by users who feel their video camera takes too long to find a new exposure time setting when the scene brightens or darkens, and technical efforts to address this have been made. To mention one example, US20110298886A1 discloses a camera for a handheld device for use in variable lighting conditions which is claimed to have a higher AE convergence speed.

The problem of slow AE convergence has an additional dimension if the video camera is used for surveillance purposes, whether with recording or not, as the surveyed objects cannot be identified with the required accuracy in severely under- or overexposed frames. The problem is exacerbated in video cameras which feed their output to a rate-controlled video encoder, which may apply heavy data compression in reaction to an incoming bitrate increase caused by the exposure artefacts. This may be noticed as a drop in image quality, and it may also prolong the convergence time considerably. Intruders who become aware of such imperfections may utilize these to conceal themselves. A sequence of illumination bursts by a (visible or infrared) strong flashlight may be all it takes to render the surveillance camera inoperable for a significant stretch of time.

SUMMARY

Making available an exposure time controller for a video camera with which the video camera becomes more suitable for use in variable lighting conditions would be beneficial. Another benefit would be having such an exposure time controller that converges rapidly and stably to a new exposure time setting after a sudden change in lighting conditions. This disclosure sets forth an exposure time controller that is suited for a video camera with an AE algorithm (AE control loop) and/or a rate-controlled video encoder, and further an exposure time control method.

At least some of these are achieved as defined by the independent claims. The dependent claims relate to advantageous embodiments.

In a first aspect, there is provided a method of controlling an exposure time (ET) variable, which is a control variable that corresponds to the current exposure time of a video camera. It is understood that the video camera is associated with (i.e., includes or is coupled to) an auto-exposure (AE) algorithm, which may be embodied as circuitry or software configured to reduce an exposure mismatch by incrementing and decrementing the ET variable, as needed. The method comprises the following steps. For a scene imaged by the video camera, ET values which are applied while the AE algorithm is active are recorded. It is determined that the exposure mismatch exceeds a threshold while the video camera is imaging the scene. The threshold may be a predefined value, and the exposure mismatch exceeding the threshold may be referred to herein as a large mismatch. Next, a distribution of the recorded ET values is estimated. Based on the estimated distribution, multiple relatively most frequent ET values are identified. The method further comprises, in reaction to determining that the exposure mismatch exceeds the threshold, assigning one of the identified ET values to the ET variable of the video camera.

Because the determined large exposure mismatch is handled by assigning one of the identified ET values to the video camera's ET variable, the setpoint-restoring AE algorithm is bypassed. This temporarily eliminates the influence of the potentially too slow or oscillatory behavior which it may exhibit when faced with the large exposure mismatch. Formulated differently, the large exposure mismatch is handled by a discontinuous modification of the ET variable, rather than relying entirely on continuous or quasi-continuous increments and decrements that the AE algorithm can instruct. In representative video surveillance environments, especially indoor environments, the lighting conditions tend to assume discrete values. This is the case, notably, if an environment is equipped with a finite number of light sources and apertures (electric luminaries, doors etc.) which are on or off, open or closed, or similar binary states. The finiteness means that the combinations are finite too, so that there is a significant likelihood that the first assigned ET value will be the appropriate one. If it is not—and rather there remains a large exposure mismatch—then, according to some embodiments, a different one of the identified ET values shall be assigned to the ET variable. Accordingly, the ET variable only undergoes discontinuous modifications until the exposure mismatch has fallen below the threshold.

In some embodiments, the AE algorithm may be temporarily inactivated when the large exposure mismatch has been determined. This constitutes a more complete bypassing of the AE algorithm than the assignment of the identified ET value on its own. The inactivation of the AE algorithm may also help suppress artifacts related to integral (I) and derivative (D) control terms, if any. The I and D terms may be said to capture a mismatch history. The related artifacts may alternatively be suppressed by resetting the I and D terms of the AE algorithm.

Different embodiments define different rules for selecting which one of the identified ET values is to be assigned or, as the case may be, which ones of the identified ET values are to be assigned as first, second, third etc. Descending relative frequency is one option. Descending relative frequency combined with the sign of a current exposure mismatch (overexposure, underexposure) is another option. A further option is to use descending relative frequency while excluding ET values that have been already assigned in the current episode of large exposure mismatch. A still further option is to use descending relative frequency combined with the sign of a current exposure mismatch and excluding ET values that have been already assigned in the current episode of large exposure mismatch; this may avoid ping-pong behaviors and infinite execution loops. The embodiments in this group aim to expedite the finding of the correct ET setting; their performance may depend significantly on the use case at hand, including the scene imaged.

Some embodiments, which primarily target a video camera with an associated rate-controlled video encoder, provide that the rate control of the video encoder shall be temporarily disabled when the large exposure mismatch is detected. This will generally cause the video encoder to exceed the desired bitrate temporarily until a suitable ET value has been found. The temporary bitrate increase is well justified since the initial exposure mismatch and the subsequent assignments of identified ET values normally lead to sudden brightness changes, which correspond to episodes of locally increased information entropy; if such episodes are to be captured with a reasonably maintained image quality, more data per unit time will be generated.

Still further embodiments provide specific teachings directed to the process leading up to the identification of the most frequent ET values, this process including the recording step and estimation step. For example, the estimation step may be restricted to ET values younger than a predetermined age. Alternatively, or additionally, the estimation step may be restricted to ET values to which the AE algorithm has converged. Alternatively, or additionally, the recording step may be executed for multiple scenes and the outputs processed separately into respective sets of most frequent ET values.

In a second aspect, there is provided an exposure time controller for controlling an ET variable of a video camera, which is associated with an AE algorithm configured to reduce an exposure mismatch by incrementing and decrementing the ET variable. The exposure time controller according to the second aspect comprises: a memory for recording ET values applied while the video camera is imaging a scene and the algorithm is active, and processing circuitry configured to: determine that the exposure mismatch exceeds a threshold while the video camera is imaging the scene; estimate a distribution of the recorded ET values; based on the estimated distribution, identify multiple relatively most frequent ET values; and, in reaction to determining that the exposure mismatch exceeds the threshold, assign one of the identified ET values to the ET variable.

The second aspect shares all or most of the technical effects of the first aspect, and it can be implemented with a corresponding degree of technical variation.

A computer program may contain instructions for causing a computer, or the exposure time controller in particular, to carry out the above method. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical, or solid-state type. Still within the scope of "data carrier", such memories may be fixedly mounted or portable.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments are shown. These aspects may, however, be embodied in many different forms and should not be construed as limiting; rather, these embodiments are provided by way of example so that this disclosure will be thorough and complete, and to fully convey the scope of all aspects to those skilled in the art. Like numbers refer to like elements throughout the description.

Figure 1:
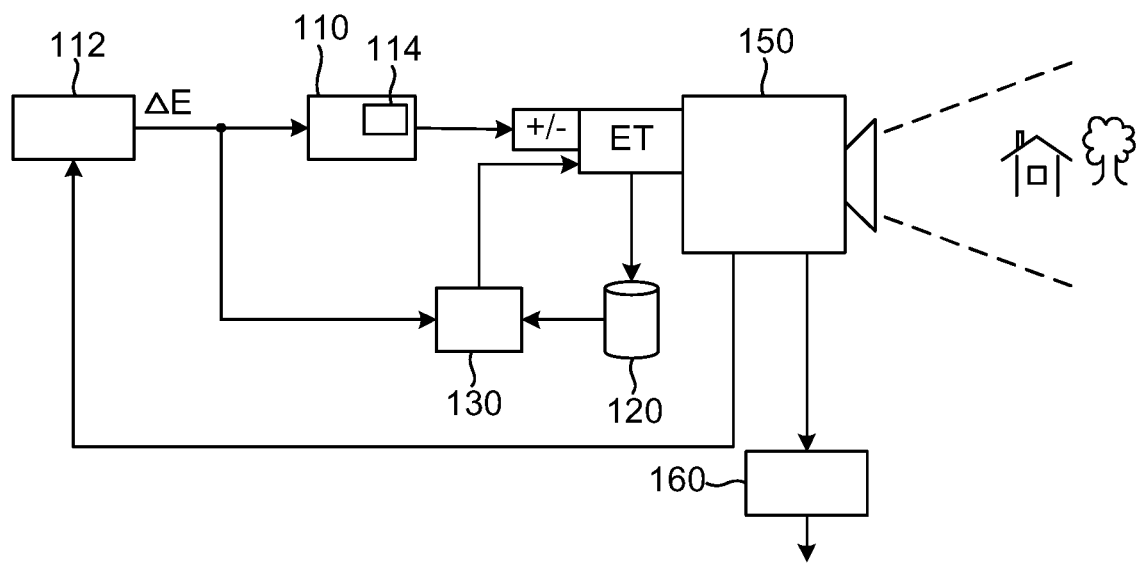
FIG. 1 is a block diagram of a video camera and an exposure time controller according to embodiments.

FIG. 1 shows an exposure time controller which comprises processing circuitry 130, a memory 120 and, optionally, further components. Deployed in the manner shown, the exposure time controller controls an exposure time variable ET of a video camera 150. Concretely, the exposure time controller is authorized to read the current value of the ET variable and to assign a new value to the ET variable. It also receives the current value of an exposure mismatch $\Delta E$ variable to be described below.

The embodiments herein are applicable to video cameras 150 of any type, performance, intended user segment etc. as long as its exposure time is controllable. In FIG. 1, the video camera 150 is connected to a video encoder 160, which is configured to encode the output video stream in a digital format suitable for storage and/or sharing with relevant recipients. The video encoder 160, which may in some embodiments be an integral part of the video camera 150, may perform various signal-processing, image-processing or other post-imaging operations. The video encoder 160 may be configured for digital formats with constant or variable bitrate. In particular, the video encoder 160 may have an optional functionality to limit the bitrate at a specified maximum value or to maintain the bitrate constant; this is achieved by applying data compression—in particular lossy data compression—in some stage(s) of the encoding process. The embodiments are applicable also to video cameras whether or not they include a video encoder 160 with these characteristics.

The video camera 150 is associated with an AE algorithm 110, which is configured to reduce an exposure mismatch $\Delta E$ by incrementing and decrementing the ET variable. In general terms, a video frame captured by the video camera has an exposure mismatch if it does not correspond to a desired (or target) exposure level; the exposure mismatch can include a quantitative component that reflects the severity of the non-correspondence. A typical range of the ET variable is 1 to 30 ms. More precisely, an exposure mismatch estimator 112 receives an output stream of the video camera 150, or a portion of the output stream, and computes an exposure mismatch indicator $\Delta E$, which is an input to the AE algorithm 110. The AE algorithm's output may include an instruction to increment or decrement the ET variable of the video camera 150. In a simple implementation, the instruction may have the values 00 (keep), 01 (increase) or 10 (decrease), wherein the two later values refer to a predefined step size $\delta > 0$ or a predefined factory $\gamma > 1$. The effect on the ET variable of the video camera 150 may be expressed by one of the following relations:

$$ET \leftarrow ET \pm \delta \quad (1a)$$

$$ET \leftarrow \gamma^{\pm 1} ET \quad (1b)$$

In other implementations, the ET variable can be incremented and decremented by a variable step size or variable factor, which allows the AE algorithm 110 to adapt its response to the magnitude of the exposure mismatch. The AE algorithm 110 need not have access to the current value of the ET variable.

The AE algorithm 110 may include a closed control loop which operates, for example, as a proportional (P) controller. The P controller may be stateful (adaptive) or stateless. The control loop may further include an integral (I) or a derivative (D) term, or both. The I and D terms refer to a history 114 of the exposure mismatch indicator ΔE. For example, the exposure mismatch history 114 may be provided by a memory which stores past values of the exposure mismatch indicator ΔE in a sliding time window.

It may be possible to discern transitory ET values from such ET values to which the AE algorithm 110 has converged. Convergence may be characterized by a gradual decrease over time of the exposure mismatch ΔE, which may be achieved by an accompanying decrease of the increments and decrements applied by the AE algorithm 110, upon which the AE algorithm 110 maintains a stable ET value of the video camera 150 provided the brightness of the scene remains substantially unchanged. To the extent the AE algorithm 110 includes an I or a D term, it is to be expected that each such term tends continuously (or quasi-continuously in discrete time) to zero at convergence. An ET value to which the AE algorithm 110 converges normally represents a correct ET setting for the scene which is being imaged.

In FIG. 1, it is notable that the AE algorithm 110 and the processing circuitry 130 of the exposure time controller are granted different access rights to the ET variable: the controller is authorized to assign arbitrary values to the ET variable whereas the AE algorithm 110 is restricted to incrementing and decrementing the ET variable. The embodiments are not limited to being used with imaging systems where this separation is upheld. Rather, it would be equivalent to configure the video camera 150 in such manner that the AE algorithm 110 is allowed to read the current value of the ET variable and to configure the AE algorithm 110 such that it always modifies the ET variable in accordance with the applicable one of the relations (1a, 1b). Then, the AE algorithm 110 and exposure time controller can be granted equal write access rights to the ET variable.

The exposure mismatch estimator 112 may be configured to count the number of overexposed (or saturated) and underexposed pixels in a video frame. Alternatively, or additionally, the exposure mismatch estimator 112 may be configured to derive performance indicators from a histogram, a distribution or other statistics for the video frame which it generates. It may be expedient to disregard chromatic properties and use a brightness histogram, a grey distribution or the like. The performance indicators may for example be skewness of distribution (or asymmetry, as measured by third central moment or third moment about a reference brightness), or peak-to-average ratio, or a combination of these. The histogram may further be evaluated with respect to a rule of thumb, such as "exposing to the right", which ensures that the video camera's dynamic range is fully utilized on the one hand and rules out overexposure on the other. Whichever of these options is chosen, it may be sufficient for the exposure mismatch estimator 112 to consider only a sparse subset of the video frames produced by the video camera 150, such an evenly spaced or random selection of frames that constitutes a certain percentage of the total number of frames. Alternatively, or additionally, the exposure mismatch estimator 112 may base its evaluation on a representative subset of the pixels in each considered frame.

It is understood that the exposure mismatch estimator 112 is configured to output an exposure mismatch variable ΔE that allows a determination of not only whether the video camera 150 has an exposure mismatch (underexposure, overexposure) but also the magnitude of the mismatch. For this purpose, the exposure mismatch ΔE may be represented as a three-bit variable, as follows:

TABLE 1

Example coding of exposure mismatch ΔE

| | |
|---|---|
| 111 | severe underexposure |
| 110 | underexposure |
| 101 | light underexposure |
| 000 | negligible mismatch |
| 001 | light overexposure |
| 010 | overexposure |
| 011 | severe overexposure |

In this example, the codeword 100 is not used. The ability to distinguish multiple degrees of over- and underexposure makes it possible to handle cases of large exposure mismatch in a special manner, as taught by the embodiments herein. In systems where the exposure mismatch variable ΔE does not indicate a magnitude of the mismatch, a mismatch of constant sign which is sustained for a relatively long duration may be interpreted as a large mismatch; in this case, the threshold may have dimension time and refer to the duration.

Figure 2:
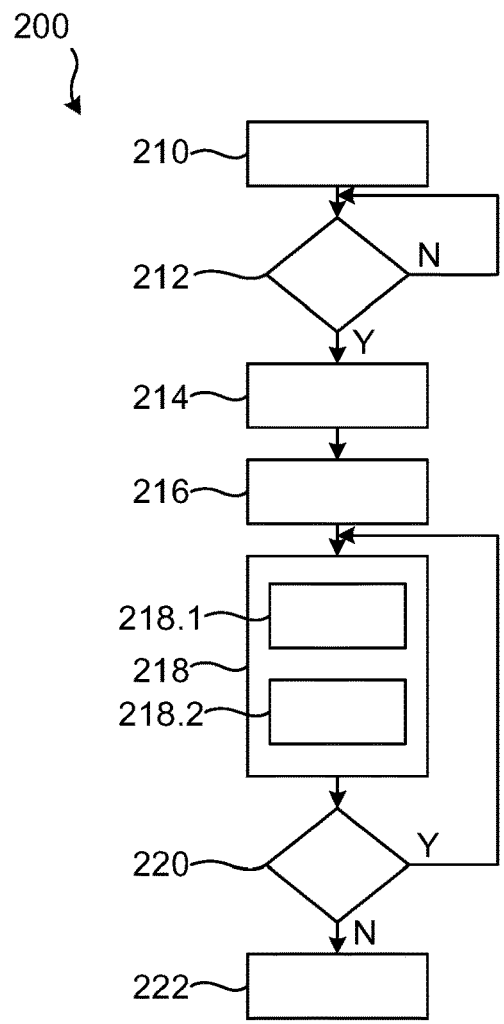
FIG. 2 is a flowchart of a method according to embodiments.

The functioning of the exposure time controller, and the processing circuitry 130 in particular, will be described with reference to the method 200 depicted in flowchart form in FIG. 2. It is understood that the method 200 can be executed also by other hardware than the exposure time controller described herein.

In a first step 210 of the method 200, the exposure time controller records ET values, which are applied while a scene is being imaged by the video camera and the AE algorithm 110 is active. The recording may proceed by storing the ET values in the memory 120. The ET values may be recorded in raw form, without any need to apply processing. The amount of the memory 120 to be utilized for recording ET values may optionally be limited, and a rotating overwriting scheme put in place such that only ET values younger than a predetermined age are retained.

In some embodiments of the method 200, ET values are recorded for multiple scenes. These may be stored in separate areas of the memory 120, may be subject to independent retention policies etc. As used in the present disclosure two "scenes" may relate to the same camera pose but differ with respect to the time of day. The lighting conditions in a naturally lit environment usually differ between morning, noon, afternoon etc. as a result of the varying sun angle, which may be further pronounced by shadowing objects in or next to the scene. Another possibility is to treat two different pan-tilt-zoom (PTZ) settings, especially for a fixedly mounted video camera, as different "scenes".

In a second step 212, the exposure time controller assesses whether the exposure mismatch ΔE exceeds a threshold while the video camera 150 is imaging the scene. In the assessment, the exposure time controller may for example evaluate whether the inequality:

$$|\Delta E| > E_{th} \quad (2)$$

holds, where $E_{th}$ denotes the threshold. If this is not verified (N branch), the execution of the method 200 repeats the assessment 212 after a predefined interval or in response to some trigger. If the exposure mismatch ΔE does exceed the threshold—whereby the exposure mismatch ΔE may be considered to be large—then the execution proceeds (Y branch) to step 214 onwards. At this point, in some embodiments of the method 200, the AE algorithm 110 may be inactivated.

Preferably, step 212 includes a passive or active verification that the currently imaged scene is that for which the ET values were recorded in step 210. If ET values have been recorded 210 for multiple scenes, it is to be verified that the currently imaged scene is one of these and that steps 214, 216 onwards are executed on the basis of the corresponding recorded ET dataset. If no ET values are available for the currently imaged scene, it might not be meaningful to execute the subsequent steps of the method 200. The recognition of one or more scenes and the distinguishing among scenes may be based on clock time, on settings of the video camera 150 (e.g., pose, PTZ) or on visual characteristics derivable from its stream of output data.

In the step 214, the distribution of the recorded ET values is estimated. The estimated distribution may be a statistical distribution, such as an approximate probability density, histogram or the like, which allows an identification of those ET values which have the highest relative frequency from among the recorded ET values. The ET values with the highest relative frequency may correspond to those which the AE algorithm 110 has been applying for the longest total time.

As mentioned, the recording step 210 is in some embodiments implemented to retain only ET values younger than a predetermined age. This indirectly restricts the step 214 too, to the effect that said ET values younger than the predetermined age form the sole basis for estimating the distribution. The predetermined age may have any duration which is deemed suitable for the use case under consideration and which provides a desired time resolution. For example, if it is intended to capture seasonal variations in natural lighting, the predetermined age may be selected as between one month and one year. To capture daily sunlight variations, the predetermined age may be of the order one hour or a fraction of an hour; it may be set larger too but is preferably less than 24 hours, as different phases of the diurnal variation might otherwise be mutually canceling and render the estimated distribution less useful.

In other embodiments, the estimation step 214 considers only such ET values to which the AE algorithm 110 has converged. Possible characterizations of convergence have been outlined above. Advantageously, these embodiments are likely to suppress artefacts, including configured initial ET values which the AE algorithm 110 applies at initialization, before reliable values of the exposure mismatch ΔE have become available.

Figure 3:
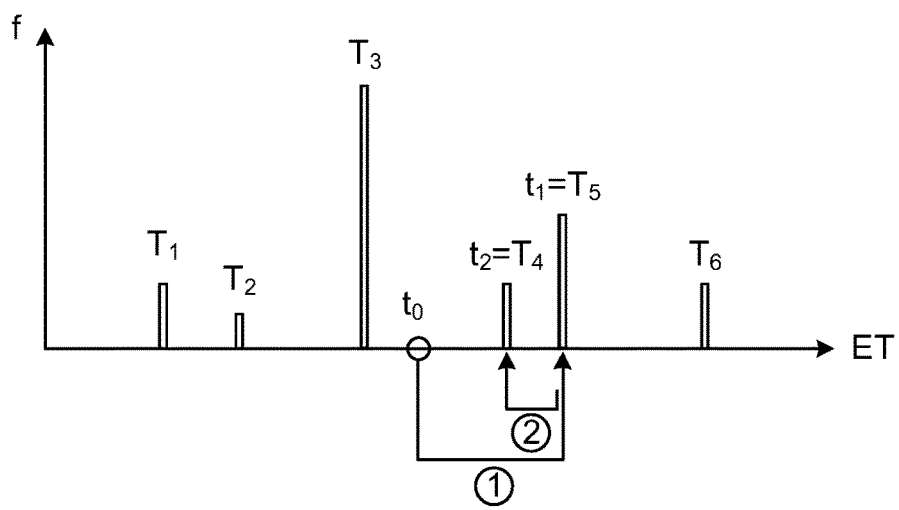
FIG. 3 is a plot of relative frequency versus exposure time, in which two ET modification events (assignments) are indicated by arrows.

In a fourth step 216, at least two relatively most frequent ET values are identified on the basis of the estimated distribution. To illustrate, FIG. 3 is a plot of relative frequency f versus exposure time ET in an example case. The relative frequency f may be represented as the number of seconds for which the ET value has been applied by the AE algorithm 110. The relative frequency f may optionally be normalized by the total duration for which the ET values have been recorded, whereby the total mass is one. As seen in FIG. 3, ET values $T_1$, $T_2$, $T_3$, $T_4$, $T_5$, $T_6$ correspond to distinctive frequency peaks, whereas the intermediate ET values have been applied for so short time (e.g., only in transitory phases) that a relative frequency f of approximately zero is visible. In step 216, therefore, the identified ET values may be the full set $T_1$, $T_2$, $T_3$, $T_4$, $T_5$, $T_6$. Alternatively, an additional requirement of a minimum relative frequency may be enforced, which may lead to the exclusion of $T_2$.

In a fifth step 218, one of the ET values which were identified in step 216 is assigned to the ET variable of the video camera 150. This is done in the hope of finding an ET value which is suitable for the continued imaging of the scene, or which is at least so close to this value that the magnitude of the exposure mismatch ΔE falls below the threshold $E_{th}$, and the fine-tuning can be entrusted to the AE algorithm 110. In step 220, to assess whether this is the case, the inequality (2) is evaluated anew.

Normal operation may be resumed if it results from step 220 that the exposure mismatch ΔE is no longer large (N branch). The resumption may include, as step 222, reactivating the AE algorithm 110 if this has been previously inactivated. In normal operation, further, the ET values are recorded as per step 210.

If instead the inequality (2) is still true, the execution is resumed from step 218, whereby further ET assignments are considered. For said first and further ET assignments, if any, the method 200 may include different strategies. Descending relative frequency is one option. Descending relative frequency combined with the sign of a current exposure mismatch (overexposure, underexposure) is another option. A further option is to use descending relative frequency while excluding ET values that have been already assigned in the current episode of large exposure mismatch. A still further option is to use descending relative frequency combined with the sign of a current exposure mismatch while excluding ET values that have been already assigned in the current episode of large exposure mismatch.

FIG. 3 illustrates an application of the last one of these options. When the illustrated process begins, the ET variable has the value $t_0$ and the exposure mismatch ΔE is indicating severe underexposure. The ET values $T_4$, $T_5$, $T_6$, a subset of the five or six values identified in step 216, are longer than $t_0$ and therefore potentially effective to resolve the underexposure condition. For the same reason, the ET values $T_1$, $T_2$, $T_3$ below $t_0$ are excluded as they would likely aggravate the underexposure. Because the ET value $T_5$ is the relatively more frequent one of $T_4$, $T_5$, $T_6$, it is used for the first assignment $t_1$ of the ET variable. After this point, an application of step 220 reveals that the exposure mismatch is still large but has changed sign: the current condition of the video camera 150 is severe overexposure. This leaves ET value $T_4$ as the only available option for a second assignment $t_2$, and then the identified ET values have been exhausted. If the assumption that the lighting conditions in the scene can only assume a stable set of discrete values, $t_2 = T_4$ will be the correct setting. If it turns out, when step 220 is executed anew, that the exposure mismatch ΔE still exceeds the threshold $E_{th}$, it may be hypothesized that the imaged scene is in a lighting condition that lacks a counterpart in the recorded ET values. The assignment strategy may address this outcome by giving back control to the AE algorithm 110. Guided by the exposure mismatch ΔE, the AE algorithm 110 will converged to an ET value that suits the current lighting condition.

The fifth step 218 may include one or more optional substeps. On the one hand, if the AE algorithm 110 is configured to increment and decrement the ET variable based on an exposure mismatch history 114, in the manner discussed above, an optional substep 218.1 may be to reset the exposure mismatch history 114. This may include flushing a memory storing past values of the exposure mismatch ΔE or assigning a zero value to an I or a D control term of the AE algorithm 110. The substep 218.1 may be executed in connection with the first ET value assignment; alternatively, it is executed as soon as the large exposure mismatch ΔE is determined.

In an alternative embodiment, if the video camera 150 is associated with a video encoder 160 with a rate control functionality, step 218 may include another optional substep 218.2, in which the rate control functionality is temporarily disabled. The disabling may occur in connection with the first ET value assignment; alternatively, it is executed as soon as the large exposure mismatch ΔE is determined. The rate control functionality may be re-enabled when the magnitude of the exposure mismatch ΔE is found to have fallen below the threshold again. As explained above, the disabling of the rate control functionality may cause the video encoder 160 to exceed a setpoint bitrate temporarily until a correct value of the ET variable has been found, which is justified in the circumstances.

According to different embodiments, step 218 may include either of the optional substeps 218.1, 218.2, both of these or neither.

The conditionality of steps 214 and 216 may be varied. According to the flowchart in FIG. 2, these steps are performed in reaction to a positive determination in step 212 that the exposure mismatch ΔE exceeds the predetermined threshold. In other envisioned embodiments, the distribution estimation 214 and the identification 216 of ET values with highest relative frequency are performed along with the recording 210 of the ET values, e.g., periodically. Accordingly, only the assignment step 218 is conditional upon the assessment in step 212. In the flowchart of FIG. 2, this alternative conditional structure corresponds to locating steps 214 and 216 before step 212, whose N branch ends immediately before step 212. The non-conditional performing of steps 214 and 216 may increase the overall computational effort but is at the same time likely to reduce the reaction time that elapses between a positive determination in step 212 and the first assignment 218 of one of the identified ET values. This may be in the interest of fast convergence.

The aspects of the present disclosure have mainly been described above with reference to a few embodiments. However, as is readily appreciated by a person skilled in the art, other embodiments than the ones disclosed above are equally possible within the scope of the embodiments, as defined by the appended patent claims.

The invention claimed is:

1. A method of controlling an exposure time ET variable of a video camera, which is associated with an auto-exposure AE algorithm configured to reduce an exposure mismatch, ΔE by incrementing and decrementing the ET variable, wherein the exposure mismatch represents overexposure or underexposure, the method comprising:
for a scene imaged by the video camera, recording ET values applied while the AE algorithm is active;
determining that the exposure mismatch exceeds a threshold while the video camera is imaging the scene;
estimating a distribution of the recorded ET values;
based on the estimated distribution, identifying multiple relatively most frequent ET values; and,
in reaction to determining that the exposure mismatch exceeds the threshold, assigning one of the identified ET values to the ET variable.

2. The method of claim 1, further comprising:
determining that the exposure mismatch is below the threshold and, in reaction thereto, activating the AE algorithm.

3. The method of claim 1, further comprising:
determining that the exposure mismatch still exceeds the threshold and, in reaction thereto, assigning a different one of the identified ET values to the ET variable.

4. The method of claim 1, wherein the assigned one or ones of the identified ET values are selected based on greatest relative frequency.

5. The method of claim 1, wherein the assigned one or ones of the identified ET values are selected as:
an identified ET value which is longer than the current ET if the exposure mismatch corresponds to underexposure; and
an identified ET value which is shorter than the current ET if the exposure mismatch corresponds to overexposure.

6. The method of claim 5, wherein already assigned ones of the identified ET values are excluded.

7. The method of claim 1, wherein the AE algorithm is configured to increment and decrement the ET variable based on an exposure mismatch history, the method further comprising:
in connection with assigning said one of the identified ET values to the ET variable, resetting the exposure mismatch history of the AE algorithm.

8. The method of claim 1, wherein the video camera is associated with a video encoder with optional rate control, the method further comprising:
in connection with assigning said one of the identified ET values to the ET variable, disabling the rate control of the video encoder temporarily.

9. The method of claim 1, wherein said estimating step is restricted to ET values younger than a predetermined age.

10. The method of claim 9, wherein the predetermined age is between one month and one year.

11. The method of claim 9, wherein the predetermined age is between one hour and one day.

12. The method of claim 1, wherein said identifying step is restricted to ET values to which the AE algorithm has converged.

13. The method of claim 1, further comprising recording ET values for at least one further scene, wherein the scenes differ by one or more of the following:
time of day;
a pan, tilt and/or zoom setting.

14. The method of claim 1, wherein the video camera is fixedly mounted.

15. A non-transitory computer-readable storage medium having stored thereon a computer program comprising instructions which, when the program is executed by a computer, cause the computer to carry out a method of controlling an exposure time ET variable of a video camera, which is associated with an auto-exposure AE algorithm configured to reduce an exposure mismatch, ΔE by incrementing and decrementing the ET variable, wherein the exposure mismatch represents overexposure or underexposure, the method comprising:

for a scene imaged by the video camera, recording ET values applied while the AE algorithm is active;

determining that the exposure mismatch exceeds a threshold while the video camera is imaging the scene;

estimating a distribution of the recorded ET values;

based on the estimated distribution, identifying multiple relatively most frequent ET values; and, in reaction to determining that the exposure mismatch exceeds the threshold, assigning one of the identified ET values to the ET variable.

16. An exposure time controller for controlling an exposure time, ET, variable of a video camera, which is associated with an auto-exposure, AE, algorithm configured to reduce an exposure mismatch, $\Delta E$, by incrementing and decrementing the ET variable, wherein the exposure mismatch represents overexposure or underexposure, the exposure time controller comprising:

a memory for recording ET values applied while the video camera is imaging a scene and the algorithm is active; and processing circuitry configured to:
determine that the exposure mismatch exceeds a threshold while the video camera is imaging the scene;
estimate a distribution of the recorded ET values;
based on the estimated distribution, identify multiple relatively most frequent ET values; and,
in reaction to determining that the exposure mismatch exceeds the threshold, assign one of the identified ET values to the ET variable.

* * * * *